T. F. O'CONNOR.
DEMOUNTABLE WHEEL.
APPLICATION FILED JUNE 16, 1917.
1,310,502.
Patented July 22, 1919.
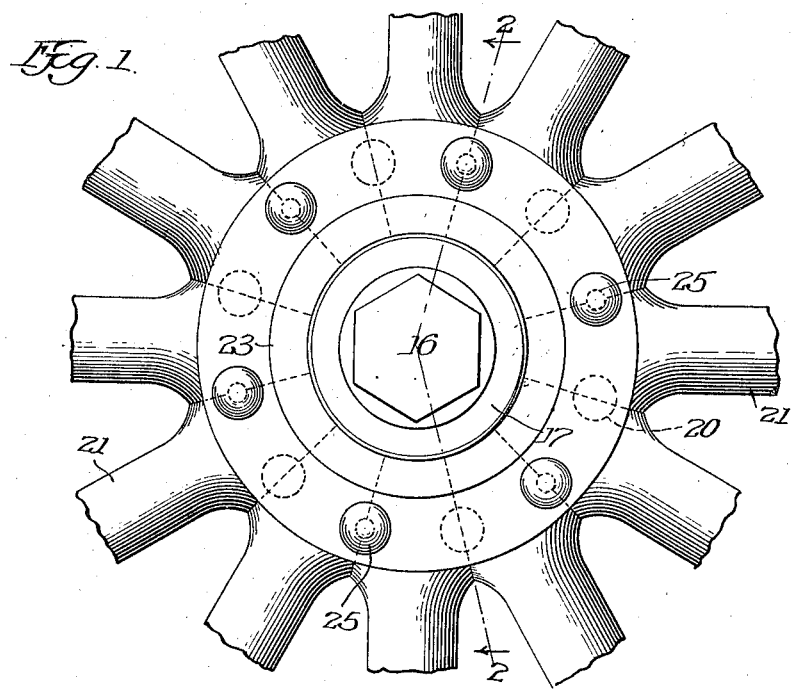
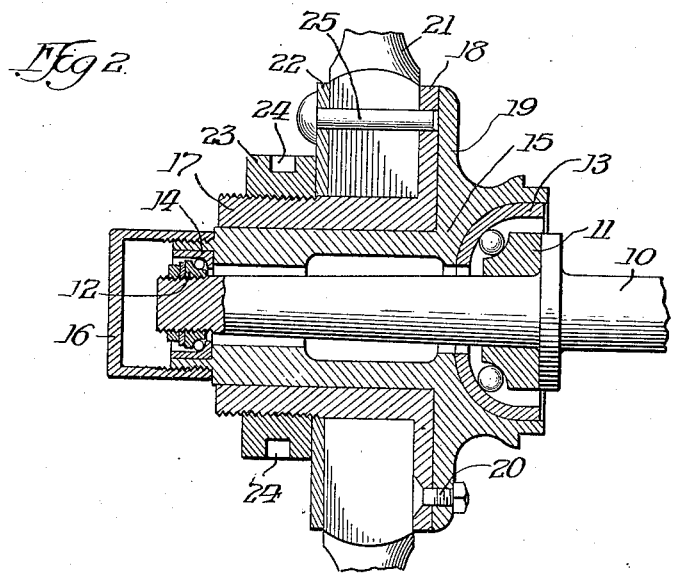
WITNESS
INVENTOR.
Thomas F. O'Connor
BY Albert C. Bell
ATTORNEY

UNITED STATES PATENT OFFICE.

THOMAS F. O'CONNOR, OF CHICAGO, ILLINOIS.

DEMOUNTABLE WHEEL.

1,310,502.  Specification of Letters Patent.  Patented July 22, 1919.

Application filed June 16, 1917. Serial No. 175,057.

*To all whom it may concern:*

Be it known that I, THOMAS F. O'CONNOR, a citizen of the United States, residing at Chicago, in the county of Cook and State of Illinois, have invented a new and Improved Demountable Wheel, of which the following is a specification.

My invention relates to an improved demountable wheel construction adapted for use particularly in connection with wheels having wooden spokes whether the wheels are manufactured in the first instance to embody my invention, or on the other hand the wheels are manufactured originally with a rigid hub construction, since the latter may readily be modified and reconstructed so as to incorporate my demountable arrangement. By my invention in cases where the wheels are already constructed I remove the spoke structure from the hub by loosening the securing bolts and mount upon the hub a sleeve which is externally threaded to receive a clamping nut which sleeve is rigidly secured by bolts to the flange of the hub mechanism. The securing bolts are replaced by studs rigidly secured in a retaining plate, which studs project through the spokes sufficiently to engage apertures therefor in the flange of the sleeve characterizing my invention. The disk and spokes are bored so as to slip over the sleeve and the wheel is held in place on the sleeve by means of the clamping nut referred to.

By my invention therefore I provide a simple and effective means for changing wheels having wooden spokes which are of the rigid type, into demountable wheels which are quickly removable from the hubs in case of accident, so that spare wheels may be placed on the hub as occasion may require. When wheels of this type are constructed in the first instance in accordance with my invention the cost of construction is little more than where the wheels are of the old rigid hub construction.

My invention will best be understood by reference to the accompanying drawings showing a preferred embodiment thereof in which, Figure 1 shows the hub in elevation, the outer ends of the spokes being broken away, and Fig. 2 is a sectional view of the parts shown in Fig. 1 taken along the lines 2—2.

Similar numerals refer to similar parts throughout the several views.

As shown in the drawings axle 10 carries ball races 11 and 12 coöperating with ball races 13 and 14 carried by hub 15 in the usual manner. A cap 16 is screwed on the end of the hub to inclose the outer ball bearing. The outer cylindrical surface of the hub 15 which in wheels of the rigid type supports the ends of the spokes and the retaining disk directly, carries in my construction a sleeve 17 provided with a flange 18 resting against the flange 19 at the inner end of the hub. The flanges 18 and 19 are secured together by countersunk bolts 20 as indicated. The inner ends of the spokes 21 are assembled in the usual manner the only difference being that they are bored so as to slip over the cylindrical surface of the sleeve 17. A retaining disk 22 similarly bored is provided to retain the spokes in place on the sleeve 17 by means of a clamping nut 23 threaded on the outer end of the sleeve, which nut is preferably provided with apertures 24 in its outer surface for convenient engagement with a spanner wrench. The disk 22 has rigidly secured to it by brazing, electric welding or other means a plurality of studs 25 which alternate with the bolts 20 and extend through the assembled inner ends of the spokes and project into holes formed to receive them in flange 18. The studs 25 therefore assist in preventing rotation between the spoke structure and the sleeve 17 although the pressure produced by the clamping nut 23 is sufficient ordinarily to prevent the spoke structure from turning on the said sleeve.

From the construction above described it will appear that old wheels provided with wooden spokes which are of the rigid hub type of construction may readily be converted into demountable wheels by boring out the inner ends of the spokes and by similarly boring the clamping disk usually provided in such construction and providing the disk with the studs 25. The sleeve 17 and its clamping nut are relatively inexpensive in construction and since the bolts 20 may pass through the holes in the flange 19 ordinarily provided for the bolts clamping the spoke structure in place no change whatever is necessitated in the structure of the hub 15. In this way wheels having standard hubs of the rigid type may be simply and quickly converted into demountable wheels with all the advantages of the latter.

While I have shown my invention in the particular embodiment described I do not, however, limit myself to the exact construction disclosed as I may employ equivalents thereof known to the art at the time of the filing of the present application without departing from the scope of the appended claim.

What I claim is:

In a demountable wheel, the combination of a hub having a flange, a sleeve fitting the cylindrical portion of said hub and provided with a flange engaging the flange of said hub, fastening devices securing the said flanges together, a spoke structure mounted on the outer surface of said sleeve and resting against the flange thereof, a retaining disk surrounding said sleeve and engaging the opposite side of said spoke structure, a clamping nut threaded on the end of said sleeve for engaging said retaining disk, and studs secured to said retaining disk and projecting therefrom through said spoke structure into apertures formed therefor in the flange of said sleeve.

In witness whereof, I hereunto subscribe my name this 6th day of June, A. D. 1917.

THOMAS F. O'CONNOR.

Copies of this patent may be obtained for five cents each, by addressing the "Commissioner of Patents, Washington, D. C."